(12) United States Patent
Tsai et al.

(10) Patent No.: US 12,184,983 B2
(45) Date of Patent: Dec. 31, 2024

(54) SYSTEMS AND METHODS FOR FREE-VIEW VIDEO STREAMING

(71) Applicant: KKCOMPANY TECHNOLOGIES PTE. LTD., Singapore (SG)

(72) Inventors: Feng Hsu Tsai, Zhubei (TW); Cho Hsuan Lee, Taipei (TW)

(73) Assignee: KKCOMPANY TECHNOLOGIES PTE. LTD., Singapore (SG)

(*) Notice: Subject to any disclaimer, the term of this patent is extended or adjusted under 35 U.S.C. 154(b) by 215 days.

(21) Appl. No.: 17/873,813

(22) Filed: Jul. 26, 2022

(65) Prior Publication Data

US 2024/0040259 A1   Feb. 1, 2024

(51) Int. Cl.
*H04N 23/698* (2023.01)
*H04N 7/18* (2006.01)
*H04N 23/90* (2023.01)

(52) U.S. Cl.
CPC .......... *H04N 23/698* (2023.01); *H04N 7/181* (2013.01); *H04N 23/90* (2023.01)

(58) Field of Classification Search
CPC ...... H04N 23/698; H04N 7/181; H04N 23/90; H04N 5/2624
See application file for complete search history.

(56) References Cited

U.S. PATENT DOCUMENTS

| | | | |
|---|---|---|---|
| 10,554,882 B2* | 2/2020 | Zhang | H04N 7/181 |
| 10,812,775 B2* | 10/2020 | Phillips | H04N 13/194 |
| 2010/0329358 A1 | 12/2010 | Zhang et al. | |
| 2012/0314015 A1* | 12/2012 | Watson | H04N 7/15 348/E7.083 |
| 2013/0050401 A1 | 2/2013 | Tannhaeuser et al. | |
| 2018/0276826 A1* | 9/2018 | Van Der Auwera | H04N 19/85 |
| 2019/0141340 A1 | 5/2019 | Reddiar et al. | |
| 2019/0253734 A1* | 8/2019 | Lee | H04N 21/26258 |
| 2020/0213631 A1* | 7/2020 | Jung | H04N 21/4728 |

OTHER PUBLICATIONS

Taiwan Office Action dated Aug. 12, 2024 issued in related TW Appln No. 112100537. (English translation provided.).

\* cited by examiner

*Primary Examiner* — Ahmed A Berhan
(74) *Attorney, Agent, or Firm* — Pillsbury Winthrip Shaw Pittman LLP

(57) ABSTRACT

The disclosure relates to methods, apparatuses, and systems of providing livestream services involving multiple camera angles. A video streaming system may provide a client with a data stream that allows for viewing the video streaming from any of the multiple cameras at the client's choosing. The video streaming system may first access image data from the multiple cameras. Image data from the multiple cameras taken at a single instance in time may be "stitched" together into a single array of image data to form an "image wall." The image wall may be compressed to be substantially smaller than the sum of their individual compressed images. A stream of image walls may be generated and transmitted to a client device. Metadata including mapping information enables the client to locate a chosen camera angle to view and switch to any camera angle viewing of the same video stream at the client's choosing.

18 Claims, 7 Drawing Sheets

SYSTEMS AND METHODS FOR FREE-VIEW VIDEO STREAMING

BACKGROUND

Video streaming has often provided a standard viewing experience involving a viewer able to see only one camera angle that the viewer has no control over. Providing the viewer with more control, including viewing a common event from different angles, would involve utilizing more cameras and more streaming bandwidth. While wireless download speeds improve over time, it would still be desirable to generate video streaming functionality that can efficiently package data from multiple cameras, in order to allow for an improved video streaming experience.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
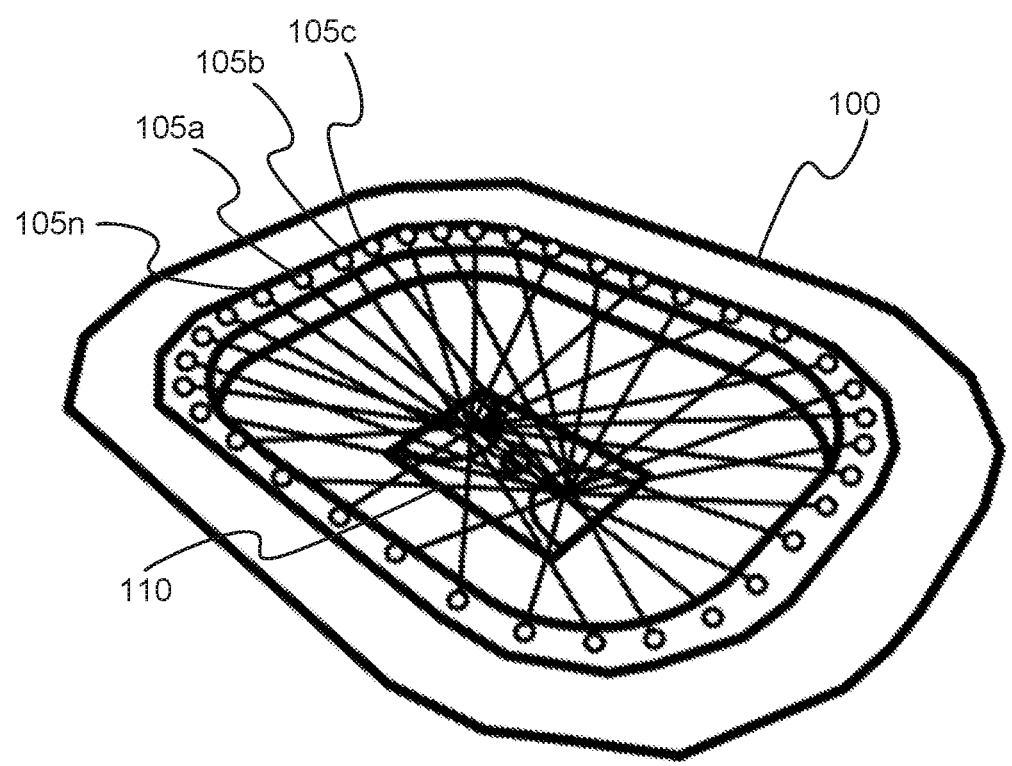
FIG. 1 shows an example venue providing a setting for capturing image data of an event from multiple different camera angles.

The disclosure relates to methods, apparatuses, and systems of providing livestream services involving multiple camera angles. For example, a system centralizing live video streaming data from multiple cameras may provide a client user with a data stream that allows for viewing the video streaming from any of the multiple cameras at the client's choosing. The video streaming system may first access image data from the multiple cameras. Image data from the multiple cameras taken at a single instance in time may be combined or "stitched" together into a single array of image data, such that the array includes a pixel map of image data from all camera angles taken at the same instance in time. This array of image data arranged in this way may be referred to herein as an "image wall." Each image wall may be efficiently compressed that results in a substantially smaller data file than the sum of their individual compressed images. This is because of the similarities and/or overlapping views of what each camera is viewing. Typically, each camera will be positioned around a venue and recording image data of the same scene, such as a basketball game or a volleyball game, but with each camera viewing the same scene at a slightly different angle. Therefore, the compression ratio of an image wall may be very high, particularly if the image wall includes image data from many different cameras, such as sixteen or thirty-two different camera angles. The video streaming system may therefore efficiently transmit a video stream of all the cameras simultaneously, by transmitting a stream of image walls, one for each timeframe, where each image wall includes the compressed image data of all the different camera angles at a particular instance in time. This stream of image walls may then be properly encoded and encrypted, and then efficiently transmitted to one or more client devices. Due to at least the high compression rate, transmitting to the client the stream of image walls is significantly more efficient than transmitting individual streams of each camera angle to the client.

In some examples, a macro-block encoding algorithm may be employed by the video streaming system to compress each image wall in a more time efficient manner. When conducting conventional compression techniques, the entire image wall may be searched to find similarities between pixels. In contrast, macro-block encoding may be used on each image wall to limit the area in which similar pixels are searched for, while still resulting in a high compression rate. This reduces the search time when compressing the image, resulting in a more time-efficient compression scheme. Macro-block encoding may be reliably used for these image walls because it is known which camera angles are similar to one another in the image wall, due to the known physical positions of the cameras. The image locations of the similar camera angle views in the image wall may be designated to be in the same macro-block, ensuring that there will be high similarities when the compression scheme searches within just the confines of the macro-block. Therefore, instead of searching the entire image wall to perform compression of each pixel, only the pixels within the same macro-block will be searched, which will still result in a high compression rate while reducing the time needed to search.

In some examples, the video streaming system may also provide metadata to the client that includes indexing information about each image wall. For example, the indexing information may provide a mapping of each image wall that enables the client to locate the beginning or range of each different camera angle within one frame of an image wall. For example, if an image wall includes image data from sixteen different camera angles, the associated metadata may include a mapping that enables the client to retrieve and display any of the sixteen camera angles from the received image wall data. This may also allow for free-range viewing by the client, meaning that the client may be able to switch viewing from one camera angle to another, even for any single recorded instance in time, at the client's choosing. In a streaming context, the included metadata therefore may allow for a client to switch to any camera angle viewing of the same video stream at the client's choosing. In contrast, conventional video telecasts or streaming services may not allow the client to change camera angles during a video streaming, or at best may only allow for pre-programming of different camera angles that the client is not able to control.

In some examples, the efficient streaming of image walls provided herein may also allow for the client to play back the video stream multiple times, each time from one or more different camera angles at the client's choosing. For example, the stream of image walls may be stored in a client device, which may allow the client to play back the recorded video stream. During each play back, the client may utilize the mapping information about each image wall from the metadata to select a different camera angle, including switching to another camera angle midstream. This allows for the client to view and study a sequence of events from multiple angles, at the client's choosing.

In some examples, the efficient streaming of image walls provided herein may also allow for the client to view the recorded scene from continuously revolving camera angles, which can make it appear as if the client is viewing a scene in three-dimensions. For example, using the stream of image walls and the associated metadata, the client may create a program to continuously change camera angles that gradually revolves around the scene, every few frames. This can make it appear to the client that the camera view is gradually revolving around the scene, which may provide an illusion of added depth perception of the scene.

In some examples, the same stream of image walls may be provided to multiple clients, enabling multiple clients to view the same scene from different angles at their own choosing. In other words, rather than a centralized system generating different, pre-programmed streaming views to accommodate needs from different clients, a single stream of image walls may be transmitted to multiple clients. Each client will be able to choose from what camera angle(s) they want to view the streamed video, using the same set of image wall data.

Referring to FIG. 1, an example venue is shown that provides a setting for capturing image data of an event from multiple different camera angles. Stadium 100 is provided that may include a center stage for an event, such as a basketball game on a basketball court 110. Placed around the stadium 100 are multiple cameras 105a, 105b, 105c . . . 105n—in this case approximately thirty-six in all—depicted with circle icons and showing their approximate camera angles via the solid straight lines pointed down into the basketball court 110. For clarity, cameras 105a, 105b, 105c . . . 105n will represent the totality of all of the cameras encircling the basketball court 110, even though not all cameras are explicitly labeled. The cameras 105a, 105b, 105c . . . 105n may all be placed at an approximately equal height around the basketball court 110, such as around the mezzanine level. In other examples, the cameras may be placed in some other arrangement, such as in a two-dimensional array facing only one side of the basketball court 110. In other examples, the cameras may be placed in a three-dimensional arrangement, such as along multiple heights encircling the entire stadium 100.

All or at least some of the cameras 105a, 105b, 105c . . . 105n may be activated to record at the same time. The cameras 105a, 105b, 105c . . . 105n may be configured to transmit their image data to a centralized system so that image data from all the activated cameras 105a, 105b, 105c . . . 105n may be packaged and efficiently transmitted to one or more clients simultaneously.

Figure 2:
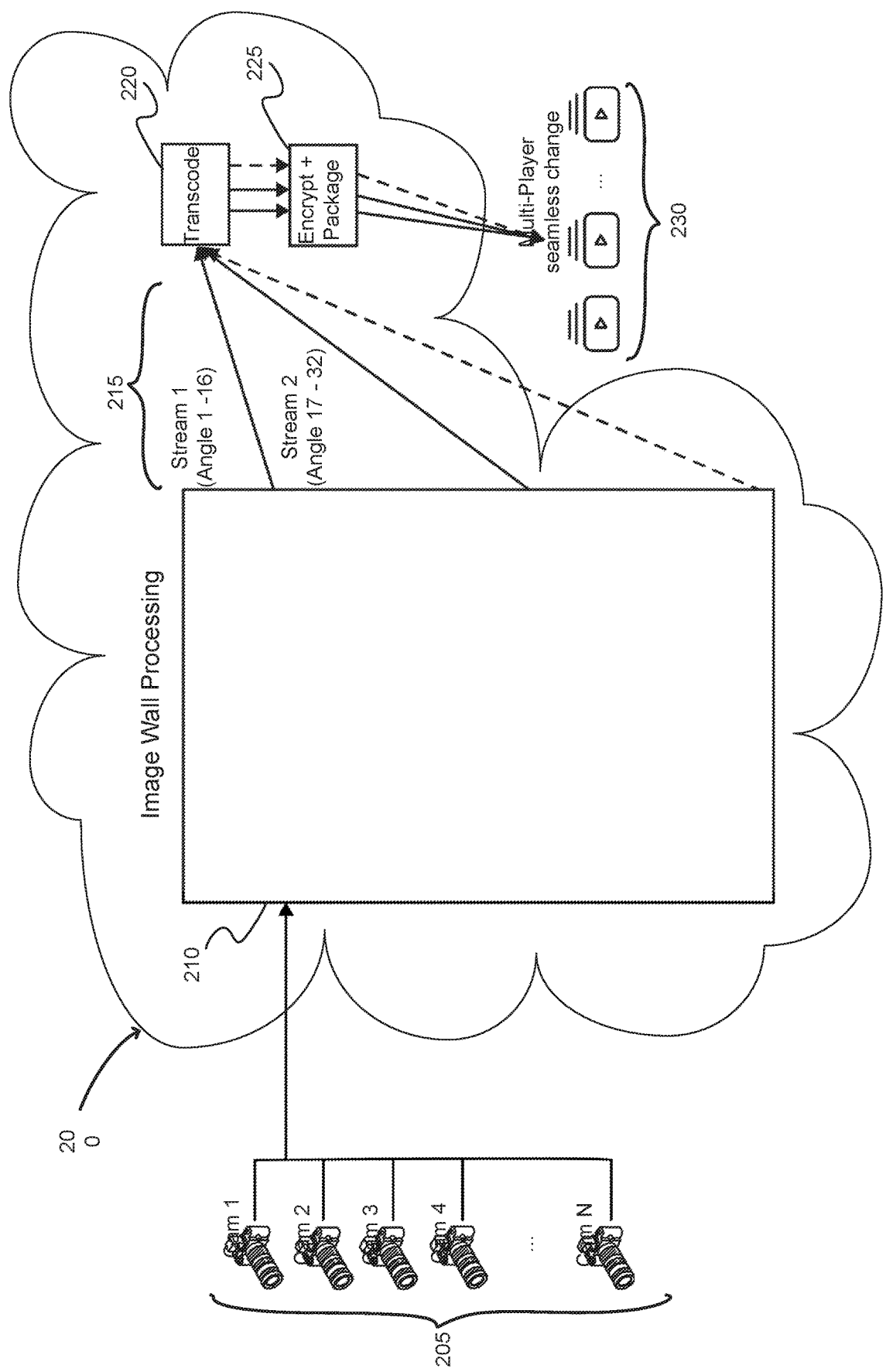
FIG. 2 shows an example data streaming environment for delivering efficient video streaming of multiple cameras to multiple clients, according to some examples.

Referring to FIG. 2, shown is an example data streaming environment for delivering efficient video streaming of multiple cameras to multiple clients, according to some examples. An array of cameras 205, Cam 1, Cam 2 . . . Cam N, may be activated to capture video of one or more events. Example arrangements for how the cameras may capture video are described with reference to FIG. 1, though other configurations are entirely possible and are not limiting. The plurality of cameras 205 may capture video simultaneously. The simultaneous footage from all cameras 205 may be sent to a video streaming system 200 for real-time or post processing.

The video streaming system 200 may exist in a cloud server or other system that is capable of processing video streaming data from all the cameras 205. The video streaming system 200 may include an input interface sufficient to receive the video streams from all the cameras 205, as well as memory capacity sufficient to store all the video streaming data. The video streaming system 200 may also include one or more processors, and generally enough processing power, through parallel processing or otherwise, sufficient to combine the video data from the multiple cameras into a stream of compressed image walls, as will be described more below. The video streaming system 200 may include sufficient transcoding hardware/firmware/software to appropriately encode the stream of image walls into one or more proper video formats, as well as sufficient encryption hardware/firmware/software to encrypt the stream of image walls. The video streaming system 200 may include an output interface sufficient to transmit a stream of encoded and encrypted image walls to one or more client devices. This may be through wired or wireless means, or a combination of both.

The video streaming system 200 may be configured to perform image wall processing 210, in order to combine video footage from all of the cameras 205 at once in an efficient manner. An image wall may include a video frame of each of the cameras 205 recorded the same instance in time. The system 200 may build the image wall by concatenating or "stitching" the video frames in an orderly manner, such as in a rectangular array of pixels. The system 200 may also generate metadata associated with the image wall. For example, the image wall may then be indexed by the video streaming system 200 to include a mapping of locations or pointers indicating where an image from a particular camera is located in the image wall. This indexing information may be stored in a metadata file associated with the image wall—or the image wall stream overall, since the mapping of camera angles may be the same for all image walls in that stream—which may be transmitted along with the image wall to one or more clients.

The video streaming system 200 may be configured to compress the image wall more efficiently than compressing each image from the cameras 205 individually. The compression rate may be high, due to cameras 205 being arranged to record a common scene generally, just from slightly different angles. Furthermore, in some examples, the compression rate may become more efficient with increasing numbers of cameras being stitched together into the image wall, due to the likelihood that the next camera added to the image wall will record video from a similar angle as an existing camera angle within the image wall, meaning that the image of the next added camera will be similar to a frame from an existing camera angle. In this way, each image wall is likely to be able to deliver image data from many camera angles in an efficient manner to a client.

As each image wall represents the combination of images of all cameras 205 taken at one instance in time, the video streaming system 200 may be configured to generate a stream of image walls, one for each timeframe of image data. The video streaming system 200 therefore may be configured to provide efficient streaming of an event from multiple different camera angles.

In some examples, multiple streams 215 may be generated by the video streaming system 200. For example, a first stream may be generated by building a first stream of image walls from a first set of camera angles, such as cameras labeled 1-16 of a venue. Cameras 1-16 may be a set of cameras facing one side of a venue, or may be a set of cameras interspersed between some other set of cameras encircling the venue, as another example. The video streaming system 200 may also generate a second stream by building a second stream of image walls from a second set of camera angles, such as cameras labeled 17-32 of the same venue. Cameras 17-32 may be a set of cameras facing an opposite side of the venue from cameras 1-16, or may be a set of cameras interspersed between some other set of cameras encircling the venue, as another example. In some examples, the video streaming system 200 may be configured to generate an arbitrary number of streams that may be include some overlapping number of cameras, for example a third stream created from cameras 1-8 and 17-24. The dashed line from the image wall processing 210 to the transcoding 220 represents that an arbitrary number of different streams may be generated according to the descriptions herein.

After building a video stream using a stream of image walls from a set of cameras, the video streaming system 200 may perform transcoding 220 of the video stream to encode each frame of image walls into an appropriate video format. This process may be performed for each one of the video streams 215. Then, the video streaming system 200 may perform appropriate encryption 225 to package the stream for transmission to a client. Any number of clients 230 may receive the same encrypted video stream. Each of the clients 230 may be able to view the video stream using a special user interface that allows the user to pick and change from what camera angle they would like to view the video stream.

Figure 3:
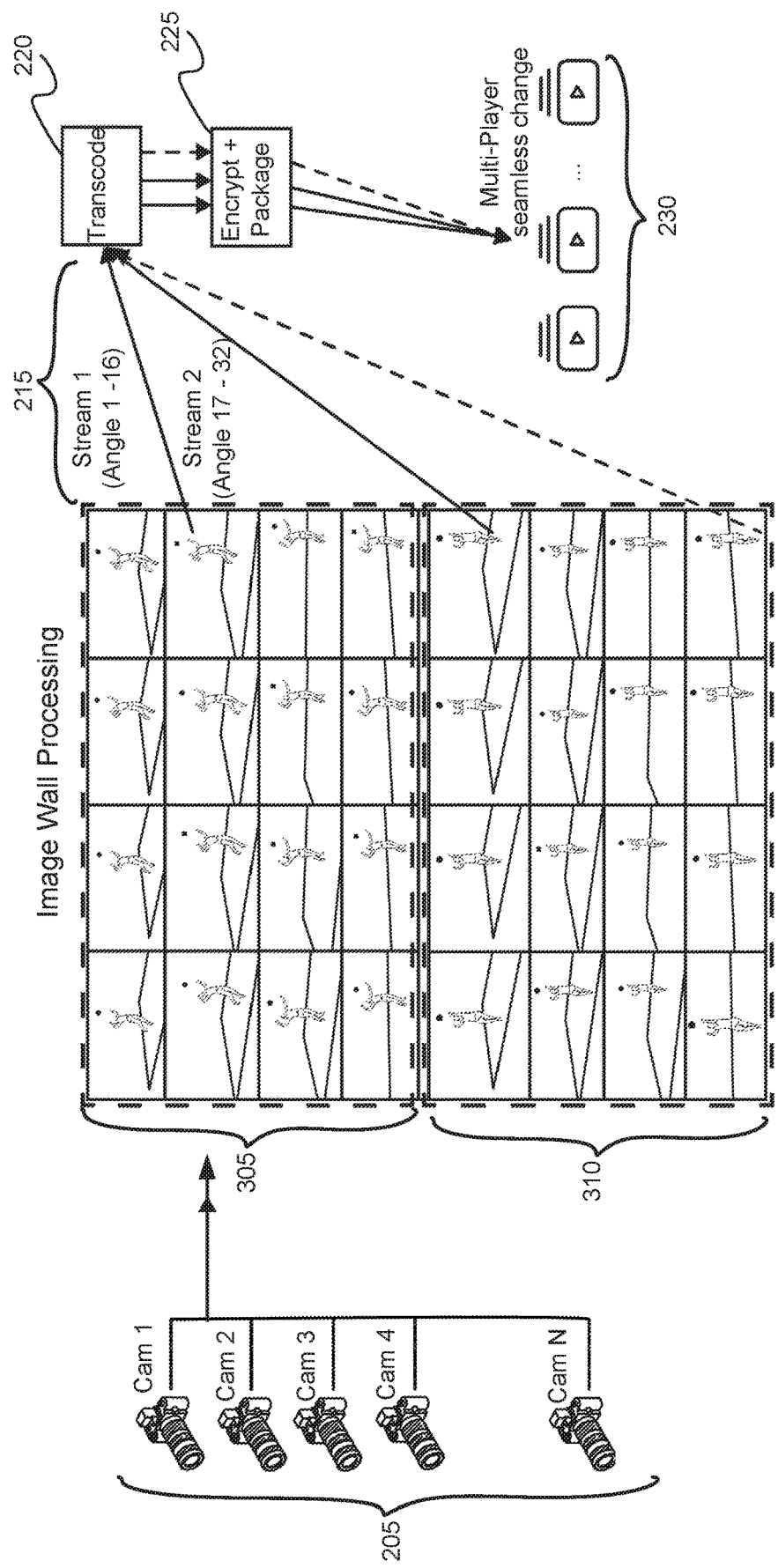
FIG. 3 shows a more detailed example of generating a video stream from multiple cameras, using image wall processing.

Referring to FIG. 3, a more detailed example of generating a video stream from multiple cameras, using image wall processing, is shown. Here, example images 305 and 310 from multiple camera views are arranged in a two-dimensional pattern. In this example, the images 305 and 310 feature a volleyball court and a player about to hit a volleyball. As shown, there are thirty-two different images of the player about to hit the volleyball, arranged in a rectangular array, such as an 8×4 array of images. These reflect the images captured, at the same instance in time, by thirty-two different cameras 205 that were positioned at different locations while facing the volleyball court. Based on the similarities in the angle of the volleyball court and orientation of the player, the cameras 205 may have been located on the same side of the volleyball court, but at slightly different heights and/or some small lateral distance apart from one another.

Using the image wall processing techniques described herein, the video streaming system 200 may generate one image wall out of some or all of the volleyball images captured at the same time by the cameras 205. Because the cameras 205 recorded images of the same scene at similar angles, compressing the image wall made up of the images 305 and/or 310 is very efficient. The video streaming system 200 may generate an image wall of say, the compressed sixteen images in the set of images 305 that is much more memory efficient than if those same sixteen images were compressed and streamed individually to a client. The video streaming system 200 may also generate metadata associated with the image wall and/or image wall stream that provides a mapping and/or a location index to locate a particular camera angle contained in the image wall. The video streaming system 200 may repeat this image wall processing for each set of images per unit time from the set of cameras 205, creating a stream of image walls that can be encoded and transmitted to a client device efficiently. In this way, the present disclosures describe how to enable a video streaming service that shows an event captured by multiple cameras and can be viewed by the client from the multiple camera angles at the client's choosing.

In some examples, the video streaming system 200 may conduct multiple sets of image wall processing, using multiple sets of cameras, in order to create different streams of the same event. In this example, images 305, made up of images from camera angles 1-16, and images 310, made of images from camera angles 17-32, may be separated from each other to form stream 1 and stream 2, respectively. That is, a first stream of image walls may be formed that uses only a subset of the available cameras recording the same event. This can allow for multiple streams of image walls to be generated by the video streaming system 200, so that, for example, a client may have an option to subscribe to different tiers of service to obtain additional viewing experiences.

Figure 4:
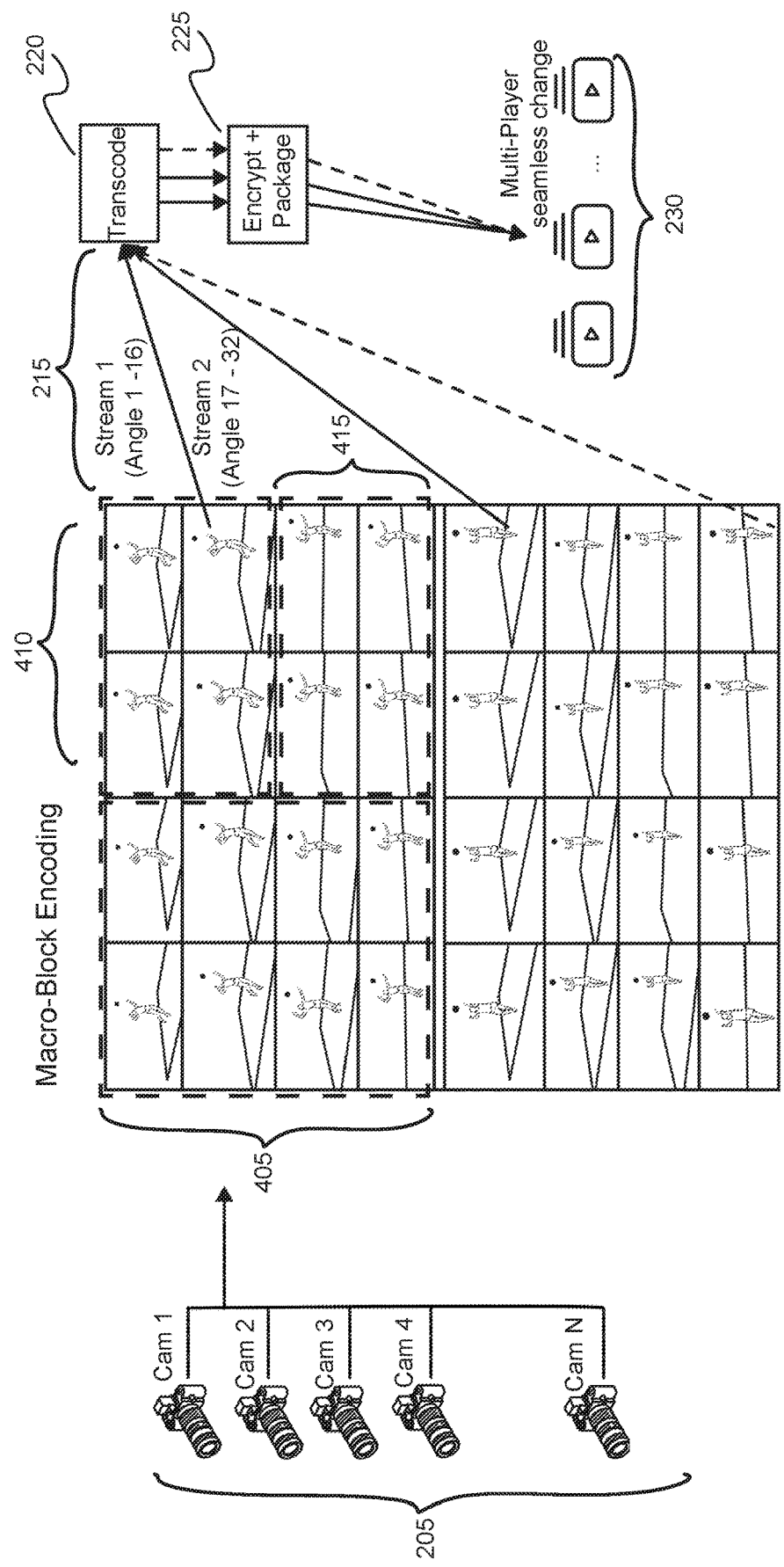
FIG. 4 shows an example of how the efficiency of the streaming service featuring multiple camera angles can be improved further by employing macro-block encoding on subsets of images in an image wall.

Referring to FIG. 4, in some examples, the efficiency of the streaming service featuring multiple camera angles can be improved further by employing macro-block encoding on subsets of images in an image wall. Macro-block encoding refers to limiting the search range of pixels in the image wall that is used to compress the image. In contrast to conventional compression techniques, which typically search the entire image to find similarities for compression, macro-block encoding intentionally limits the search range of pixels in the image wall when compressing. This effectively reduces the amount of time needed to compress an image wall.

In this example, the search ranges for compression of the first sixteen images have been partitioned into the highlighted windows 405, 410, and 415. This means that a compression technique for finding the similarities of the eight images within window 405 will be limited to only those eight images. The same goes for the images in window 410 and the images in window 415. Thus, the amount of searching to find similarities for these images is reduced from searching all 32 images of the image wall to searching just four or eight images in their localized portion of the image wall.

Because of the known locations of the cameras 205 and their orientation to a common scene or event, and because the positions of the images from the cameras 205 can be pre-positioned when forming the image wall, macro-block encoding can be employed on subsets of images with a high degree of efficiency. For example, the four images in the window 410 can be known to consistently look similar to one another, due to prior knowledge of where the cameras are placed that captured those four images, and due to the prior knowledge of where the images from those four cameras are positioned in the image wall (e.g., as the four images in the top right corner of the image wall). Therefore, a macro-block window 410 may be placed around those four images to limit the search window for finding similarities when compressing the entire image wall. This reduces the search range for compressing these four images from all 32 images of the image wall down to just the four. The same reasoning can be applied to windows 405 and 415, and so on for other subsets of images within the entire image wall.

In some examples, additional encoding techniques may be employed to further improve the efficiency of encoding an image wall. These techniques include employing a block-based motion estimation vector and a pixel-based residue that is extracted from a base frame of a prior image wall. Block-based motion estimation may refer to a coding technique for estimating the motion between a macro block of a current frame and a matched candidate block of a reference frame. Pixel-based residue may refer to including a "residue" coding step that codes a predicted value of an image pixel based on previously reconstructed nearby pixels.

These techniques can be reliably used for encoding image walls in part due to the prior knowledge of where the cameras are placed that captured the images used in the image wall, and due to the prior knowledge of where the images from those cameras are positioned in the image wall. These techniques may increase the encoding efficiency because the encoded residue can be saved as much as possible due to easily finding the best matched referenced block using a predefined/pre-layout image wall. For example, a specifically referenced macro-block can be referred to directly in the image wall, instead of finding the referenced macro-block one by one. This saves time and energy resources.

In some examples, a client device is included that is configured to receive the stream of image walls. An example of the client device may be a set top box, specially configured to decode and decompress each image wall within a stream of image walls, and to cause display of at least one camera angle within each image wall. The specially configured set top box may utilize the received metadata and apply the camera mapping found in the metadata to each image wall received. The user may then interact with a user interface to select a camera angle, and the client device may respond by showing the streaming image data within each image wall associated with that specified camera angle.

For example, the client device may receive the metadata to be able to know the mapping of the image position relationship in the image wall. More For example, say the image wall size is 7680×4320 pixels, then the first image index (x, y) from camera 1 would be within the boundaries (0, 0), (1920, 0), (0, 1080), (1920, 1080); while the second image index (x, y) would be within the boundaries (1920, 0), (3840, 0), (1920, 1080), (3840, 1080), and so on. When the client device moves to different angles quickly, the client device would be able to just cut out the image and show it at a fast and responsive rate using the metadata.

The client user may also be able to interact with the user interface to switch to another camera angle midstream. The client device may switch to displaying the specified camera angle by utilizing the mapping from the metadata. The client user will be able to switch to any of the different camera angles, at any time midstream, at the client's choosing.

In some examples, the client may be able to program the client device using the user interface to switch to different camera angles according to a pre-arranged program. Thus, rather than manually switch camera angles, a program can be followed that automatically switches at set time intervals. This may allow for the appearance of a three-dimensional viewing experience, if for example the programmed camera angle changes occur quickly enough and across cameras positioned closely enough to one another.

Figure 5:
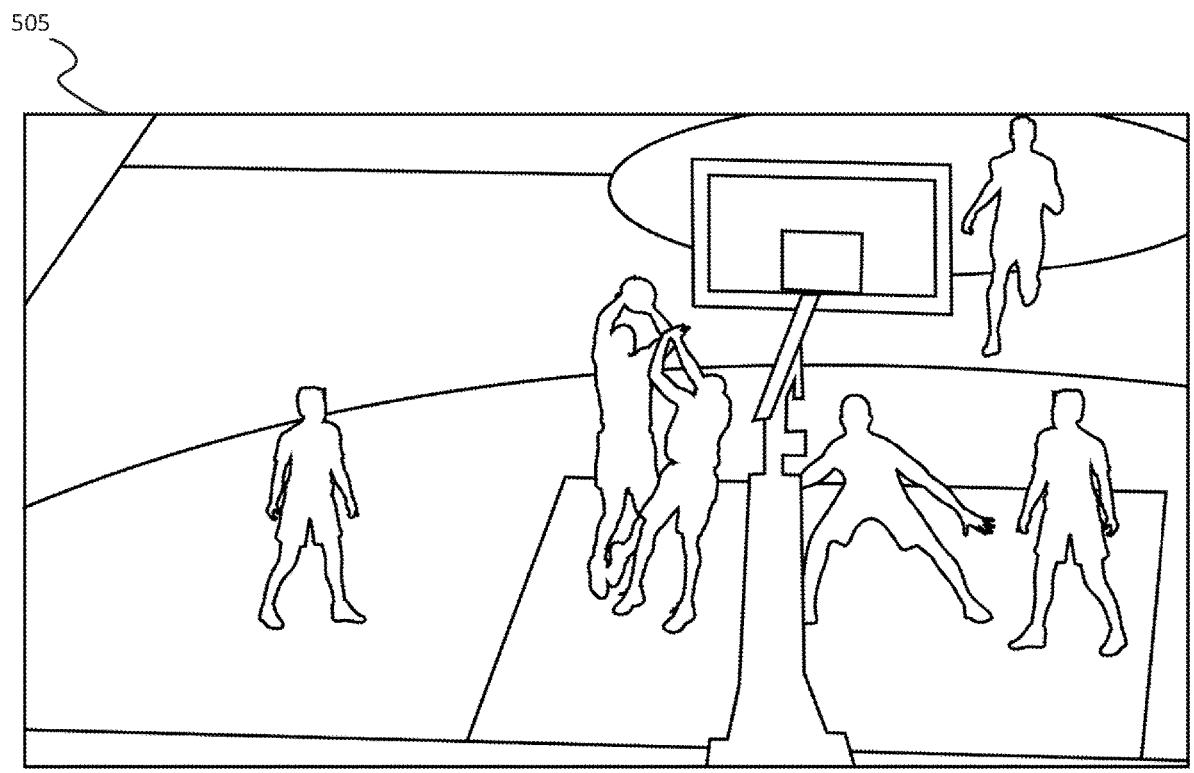
FIG. 5 illustrates an example of how a client user may be able to replay an event using camera angles of the client's choice that are different than the camera angles the client originally used to view the game in the first place, using the video streaming functionality described herein.

Referring to FIG. 5, in some examples, the stream of image walls transmitted to a client device may allow for a user to perform video streaming functionality that has never been enabled before. For example, a user may be able to replay an event, such as a basketball game depicted in illustration 500, using camera angles of the client's choice that are different than the camera angles the client originally used to view the game in the first place. This is because each image wall in the video stream contains all the camera angles available in that stream, for that frame in time. The client therefore has the ability to replay the video stream and pick any other camera angle available in that stream. In contrast, conventional video stream replays allow for just one camera angle at any point in time, and the camera angle is typically chosen by a producer or director of the video stream, rather than the client user.

Figure 6:
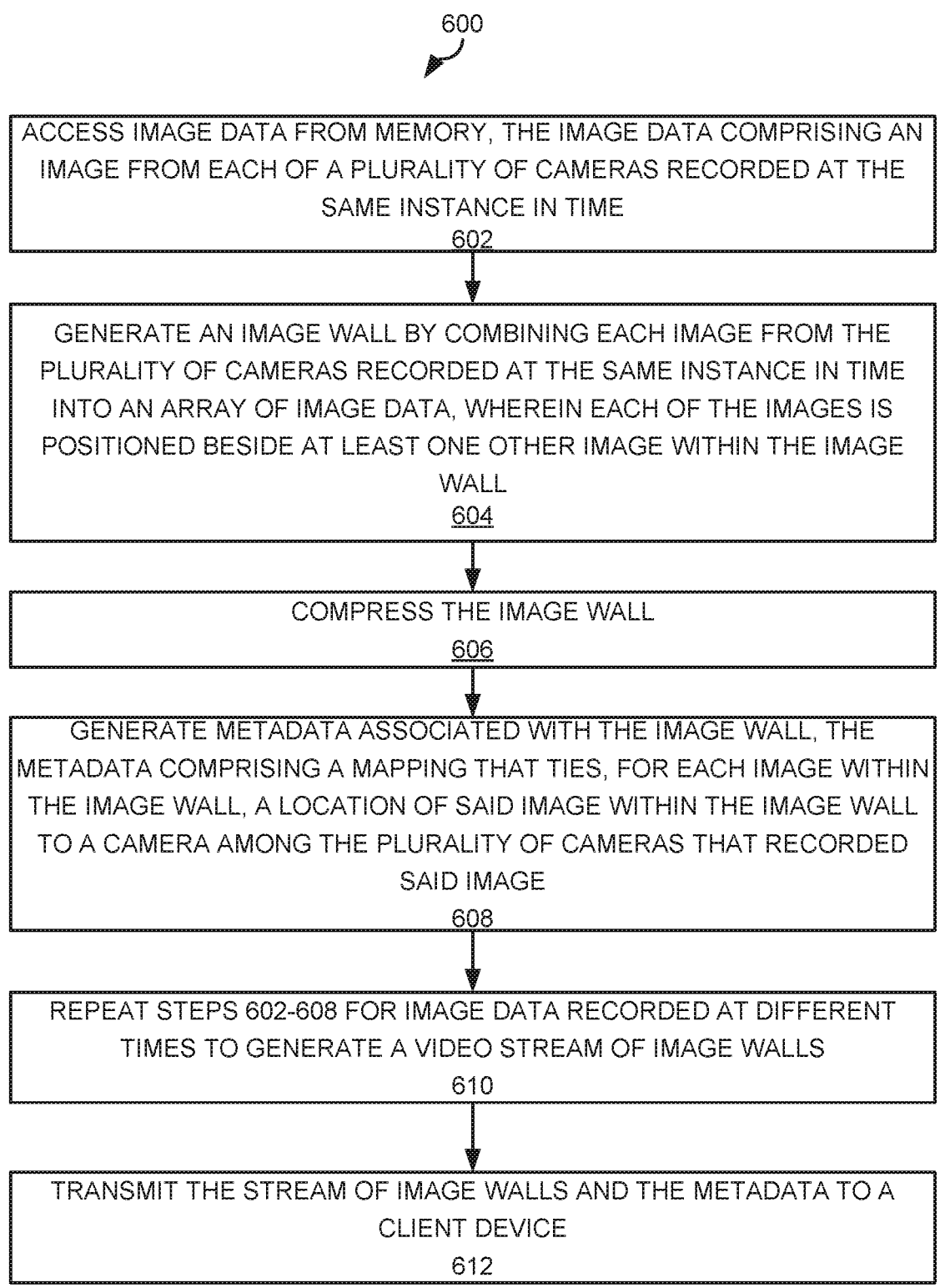
FIG. 6 illustrates an example of a method of providing video streaming utilizing image walls.

FIG. 6 illustrates an example of a method 600 of providing video streaming. This method may be performed by a video streaming system, such as video streaming system 200. At 602, the method 600 may include accessing image data from a memory, such as a memory associated with the video streaming system 200. The image data may include an image from each of a plurality of cameras recording an event at the same instance in time. An example of the plurality of cameras may be the cameras 205, which may be arranged in any of the configurations described in FIG. 1, for example.

At 604, the method may include generating an image wall by combining each image from the plurality of cameras recorded at the same instance in time into an array of image data, wherein each of the images is positioned beside at least one other image within the image wall. An example of an image wall is described in FIGS. 2, 3, and 4. At 606, the method may include compressing the image wall. Known compression algorithms may be used to perform the compression. In some examples, compressing the image wall may include employing macro-block windows to partition the image wall into smaller search windows. An example of the macro-block windowing is described with reference to FIG. 4.

At 608 the method may include generating metadata associated with the image wall, the metadata comprising a mapping that ties, for each image within the image wall, a location of said image within the image wall to a camera among the plurality of cameras that recorded said image. Further example details of the metadata are described in reference to FIG. 2, above.

At 610, a stream of image walls may be generated by repeating the processes described in 602-608, for different sets of images from the plurality cameras taken at different instances in time. In some examples, the metadata associated with one image wall does not need to be created again for each successive image wall in the stream, because the mapping may be the same for each image wall. At 612, the method may include transmitting the stream of image walls and the associated metadata to a client device.

Figure 7:
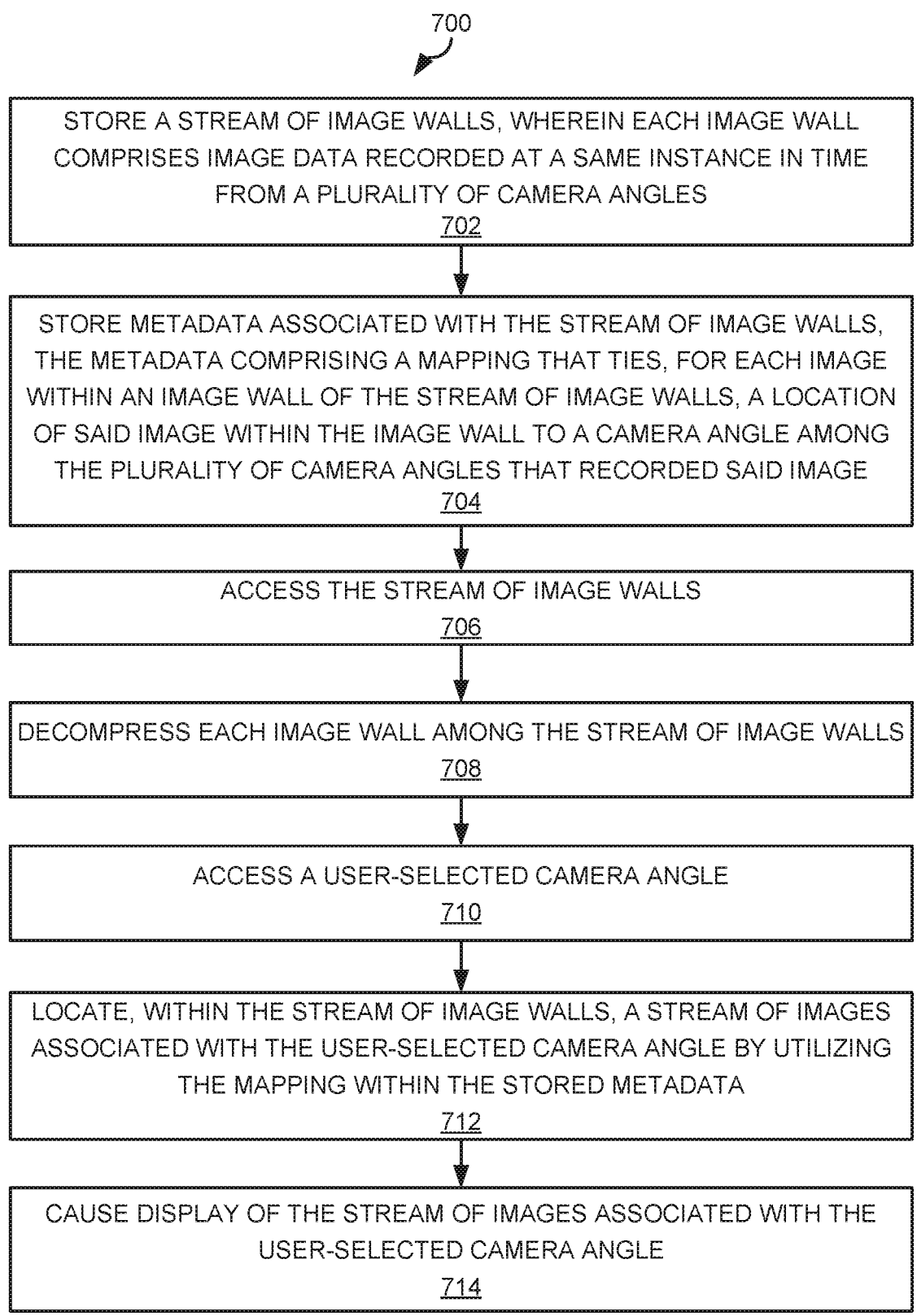
FIG. 7 illustrates an example of a method of a client device for causing display of a video stream arising out of the stream of image walls.

FIG. 7 illustrates an example of a method 700 of a client device for causing display of a video stream arising out of the stream of image walls. Examples of the client device may include a set top box, computer server, digital television, or mobile device. At 702, the method 700 may include storing in a memory a stream of image walls, wherein each image wall comprises image data recorded at the same instance in time from a plurality of camera angles. The stream of image walls may be received from a video streaming system 200 through one of various means, such as via satellite network, wireless Internet or co-axial cable, as just a few examples.

At 704, the method may include storing metadata associated with the stream of image walls, the metadata comprising a mapping that ties, for each image within an image wall of the stream of image walls, a location of said image within the image wall to a camera angle among the plurality of camera angles that recorded said image. Further example details of the metadata are described with reference to FIG. 2, above.

At 706, the method 700 may include accessing the stream of image walls from the memory of the client device. At 708, the method 700 may include decompressing each image wall among the stream of image walls. Standard decompression techniques may be used. At 710, the method may include accessing a user-selected camera angle. This selection may be an input provided through a special user interface associated with the system for streaming video that utilizes the stream of image walls. At 712, the method may include locating, within the stream of image walls, a stream of images associated with the user-selected camera angle by utilizing the mapping within the stored metadata. The client device may find the images associated with camera angle selected by the user by referring to the mapping of the image wall as specified by the metadata. At 714, the method may include causing display of that stream of images associated with the user-selected camera angle.

Throughout the disclosure, the terms "a" and "an" may be intended to denote at least one of a particular element. As used herein, the term "includes" means includes but not limited to, the term "including" means including but not limited to. The term "based on" means based at least in part on.

The components of the system environment illustrated in FIGS. 2, 3, and 4 may be connected to one another via a communication network (not illustrated), which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment components may communicate.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather, the method blocks may be performed in any order that is practicable including simultaneous performance of at least some method blocks. Furthermore, each of the methods may be performed by one or more of the system components illustrated in the figures.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for providing video streaming services, the system comprising: a memory configured to store image data from a plurality of cameras, the image data comprising an image from each of the plurality of cameras recorded at a same instance in time; a processor coupled to the memory; and an output interface coupled to the processor; wherein the processor is configured to: access the image data from the memory; generate an image wall by combining the each images from the each of the plurality of cameras recorded at the same instance in time into an array of image data, wherein the image from the each of the plurality of cameras is positioned beside at least one other image within the image wall; compress the image wall; and generate metadata associated with the image wall, the metadata comprising a mapping that ties, for each image within the image wall, a location of said each image within the image wall to a camera among the plurality of cameras that recorded said each image; wherein the output interface is configured to transmit the compressed image wall and the associated metadata to a client device; wherein the processor is further configured to partition the image wall into a plurality of macro-block windows, each macro-block window comprising image data of two or more images within the image wall; and wherein compressing the image wall comprises, for each pixel of the image wall, utilizing a compression search window equal to the macro-block window for which said pixel is positioned within.

2. The system of claim 1, wherein the each of the plurality of cameras are positioned at different camera angles while recording a common event or scene, and the each image of the image data comprises a view of the common event or scene but recorded at the different camera angles.

3. The system of claim 1, wherein the image wall comprises a rectangular array of image pixels.

4. The system of claim 1, wherein the plurality of cameras comprises at least sixteen cameras, and the image data comprises at least sixteen images recorded at the same instance in time.

5. The system of claim 1, wherein the processor is further configured to utilize a motion estimation vector to encode the image wall.

6. The system of claim 1, wherein the processor is further configured to utilize pixel based residue to encode the image wall.

7. The system of claim 1, wherein the processor is further configured to generate a stream of image walls, using a stream of image data recorded from the plurality of cameras; and the output interface is configured to transmit the stream of image walls to the client device.

8. A method for providing video streaming services, the method comprising: accessing image data from a plurality of cameras, the image data comprising an image from each of the plurality of cameras recorded at a same instance in time; generating an image wall by combining the each image from the plurality of cameras recorded at the same instance in time into an array of image data, wherein the each of the images is positioned beside at least one other image within the image wall; compressing the image wall; generating metadata associated with the image wall, the metadata comprising a mapping that ties, for the each image within the image wall, a location of said each image within the image wall to a camera among the plurality of cameras that recorded said each image; transmitting the compressed image wall and the associated metadata to a client device; partitioning the image wall into a plurality of macro-block windows, each macro-block window comprising image data of two or more images within the image wall; and wherein compressing the image wall comprises, for each pixel of the image wall, utilizing a compression search window equal to the macro-block window for which said pixel is positioned within.

9. The method of claim 8, wherein each of the plurality of cameras are positioned at different camera angles while recording a common event or scene, and the each image of the image data comprises a view of the common event or scene but recorded at the different camera angles.

10. The method of claim 8, wherein the image wall comprises a rectangular array of image pixels.

11. The method of claim 8, wherein the plurality of cameras comprises at least sixteen cameras, and the image data comprises at least sixteen images recorded at the same instance in time.

12. The method of claim 8, further comprising utilizing a motion estimation vector to encode the image wall.

13. The method of claim 8, further comprising utilizing pixel based residue to encode the image wall.

14. The method of claim 8, further comprising:
generating a stream of image walls, using a stream of image data recorded from the plurality of cameras; and
transmitting the stream of image walls to the client device.

15. A system for viewing a video stream associated with a plurality of camera angles, the system comprising:
a memory configured to:
store a stream of image walls, wherein each image wall comprises image data recorded at a same instance in time from the plurality of camera angles; and
store metadata associated with the stream of image walls, the metadata comprising a mapping that ties, for each image within an image wall of the stream of image walls, a location of said each image within the image wall to a camera angle among the plurality of camera angles that recorded said each image; and
a processor coupled to the memory;
wherein the processor is configured to:
access the stream of image walls;
decompress the each image wall among the stream of image walls;
access a user-selected camera angle;
locate, within the stream of image walls, a stream of images associated with the user-selected camera angle by utilizing the mapping within the stored metadata; and
cause display of the stream of images associated with the user-selected camera angle.

16. The system of claim 15, wherein the user-selected camera angle is a first user-selected camera angle, and the stream of images associated with the camera angle is a first stream of images associated with a first camera angle;
wherein the processor is further configured to:
access a second user-selected camera angle;
locate, within the stream of image walls, a second stream of images associated with the second user-selected camera angle by utilizing the mapping within the stored metadata; and
cause a switching of display from the first stream of images associated with the first user-selected camera angle to display of the second stream of images associated with the second user-selected camera angle.

17. The system of claim 15, wherein the processor is further configured to cause a play back of at least some of the images in the stream of image walls.

18. The system of claim 15, wherein the processor is further configured to:
access a user-specified program of changing camera angles as a function of time; and
cause a display of the stream of images from the stream of image walls that corresponds to the changing camera angles as the function of time.

* * * * *